(12) United States Patent
Sadri (10) Patent No.: US 6,690,652 B1
(45) Date of Patent: Feb. 10, 2004

(54) ADAPTIVE POWER CONTROL IN WIDEBAND CDMA CELLULAR SYSTEMS (WCDMA) AND METHODS OF OPERATION

(75) Inventor: Ali S. Sadri, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,991

(22) Filed: Oct. 7, 1999

Related U.S. Application Data
(60) Provisional application No. 60/105,639, filed on Oct. 26, 1998.

(51) Int. Cl.[7] ............................................. H04J 13/00
(52) U.S. Cl. ...................... 370/252; 370/342; 455/522
(58) Field of Search ............................... 370/277–280, 370/311, 318, 252, 335, 342; 455/574, 343, 522; 379/395.01

(56) References Cited

U.S. PATENT DOCUMENTS

| | | | | |
|---|---|---|---|---|
| 5,056,109 A | * | 10/1991 | Gilhousen et al. | 370/311 |
| 5,204,876 A | * | 4/1993 | Bruckert et al. | 375/130 |
| 5,341,397 A | | 8/1994 | Gudmundson | 375/1 |
| 5,375,140 A | * | 12/1994 | Bustamante et al. | 370/335 |
| 5,383,219 A | | 1/1995 | Wheatley, III et al. | 375/1 |
| 5,596,570 A | * | 1/1997 | Soliman | 370/252 |
| 5,604,730 A | * | 2/1997 | Tiedemann, Jr. | 370/252 |
| 5,715,526 A | | 2/1998 | Weaver, Jr. et al. | 455/126 |
| 5,729,557 A | | 3/1998 | Gardner et al. | 371/41 |
| 5,754,541 A | | 5/1998 | Glisic et al. | 370/335 |
| 5,768,684 A | * | 6/1998 | Grubb et al. | 370/318 |
| 5,778,316 A | | 7/1998 | Persson et al. | 455/434 |
| 5,822,318 A | | 10/1998 | Tiedemann, Jr. et al. | 370/391 |
| 5,859,839 A | * | 1/1999 | Ahlenius et al. | 370/252 |
| 5,872,775 A | | 2/1999 | Saints et al. | 370/342 |
| 5,898,740 A | * | 4/1999 | Laakso et al. | 370/318 |
| 5,914,950 A | * | 6/1999 | Tiedemann et al. | 370/348 |
| 6,157,616 A | * | 12/2000 | Whitehead | 370/252 |

FOREIGN PATENT DOCUMENTS

JP        6-276176        9/1994        ............ H04J/13/00

OTHER PUBLICATIONS

Eyceoz et al., "Prediction of Fast Fading Parameters by Resolving the Interference Pattern", Nov. 2, 1997, IEEE, Conference Record of the Thirty–First Asilomar Conference on Signals, Systems, and Computers, Vol. pp. 167–171.*

"Adaptive Coding Rate and Process Gain Control with Channel Activation for Multi–Media DS/CDMA Systems" by. S. Abeta, S. Sampie, N. Morinaga, IEICE Trans. Commun., vol. E80–B, No. 4 Apr. 1997, pp. 581–583 Only.

* cited by examiner

Primary Examiner—Huy D. Vu
Assistant Examiner—Justin M Philpott
(74) Attorney, Agent, or Firm—Morgan & Finnegan

(57) ABSTRACT

A WCDMA system includes a Base Station (BS) transmitter, or forward transmitter and a pilot channel that transmits control signals between the BS and a Mobile Station (MS) to reconfigure their transmitter/receiver. Reconfiguration is performed according to the prediction of the channel attenuation and the threshold set at the BS or MS based on its channel power probability density function separated into three distinct equal probable regions. In one embodiment, Seamless Rate Change (SRC)/Transmitter Power Control (TPC) logic uses the predicted channel attenuation to signal both the transmitter and the receiver in a channel to reconfigure their transmit power level according to the power density function (pdf) of the channel power and threshold level. A transmission rate is reduced when the power level is below the threshold and increased when the channel power is above threshold. The pilot channel is used to signal the mobile station and the base station.

20 Claims, 13 Drawing Sheets

Power Value

PRIOR ART

PRIOR ART

FIG. 3

PDF of channel power at the beginning of each slot

ADAPTIVE POWER CONTROL IN WIDEBAND CDMA CELLULAR SYSTEMS (WCDMA) AND METHODS OF OPERATION

This invention claims the benefit of the filing date of Provisional Application, Serial No. 60/105,639, entitled "Seamless Rate Change In Wideband CDMA Cellular System (WCDMA)", filed Oct. 26, 1998, assigned to the assignee of the present invention and fully incorporated herein by reference.

RELATED APPLICATION

This application is related to Ser. No. 09/413,915, filed Oct. 7, 1999, entitled "ADAPTIVE POWER CONTROL BASED ON A RAKE RECEIVER CONFIGURATION IN WIDEBAND CDMA CELLULAR SYSTEMS (WCDMA) AND METHODS OF OPERATION", assigned to the same assignee as that of the present invention and fully incorporated herein by reference.

BACKGROUND OF INVENTION (1) Field of Invention

This invention relates to communication systems and methods of operation. More particularly, the invention relates to adaptive power management in WCDMA systems and methods of operation.

(2) Description of the Prior Art

In wireless communication system, signal fading due to multipath radio propagation severely degrades the performance and imposes high transmitter power requirement. Since the characteristic of a channel changes rapidly, a transmitter and a receiver can not be configured to operate at their optimum performance level and therefore, they fail to exploit full potential of the wireless system. Code Division Multiple Access (CDMA) provides increased capacity due to the fact that each user in the system occupies the entire frequency band and therefore there is no waste of bandwidth due to channel spacing. Several systems have been proposed for the third generation wireless system. The most popular system under study is the Wideband CDMA (W-CDMA) system, described in an article entitled "Channel Estimation for the W-CDMA System, Performance and Robustness Analyses from a Terminal Perspective," by B. Lindof, C. Ostberg, and H. Eriksson, published at the IEEE Vehicular Technology Conference. Document 90. May 1999.

Developers of the third generation wireless system in the industry envision crystal clear voice service, video conferencing from anywhere, high speed mobile Web surfing, and thousands of advanced applications right over the wireless phone or handheld PC. Generally, any enhancement to the system that can improve delivery of high-speed data, voice and video over mobile devices along with increasing the battery life are challenging topics for consideration and improvement.

In papers entitled "Symbol Rate and Modulation Level-Controlled Adaptive Modulation/TDMA/TDD System for High-Bit-Rate Wireless Data Transmission," by T.Ue, S. Sampei, N. Morinaga, and K. Hamaguchi, published in the IEEE Transaction on Vehicular Technology, Vol. 47. No. 4, Pp. 1134–1147, November 1998, pages 1134–1147, and "Adaptive Coding and Processing Gain Control with Channel Activation for Multimedia DS/CDMA System," by S. Abeta, S. Sampei, and N. Morinaga, published in IEICE Transaction on Communication, Vol. E80-B, No. 4. April 1997, pages 581–583; the authors propose a symbol rate, gain and coding change scheme through the use of feedback transmission of the information from the Base Station (BS) to the Mobile Station (MS). In these proposals, the quality of the channel was determined on the basis of the calculation of the short-term signal to interference ratio $C/(N_0+I_0)$ at the BS receiver, where C is Signal Power; $N_O$ is AWGN Power, and $I_O$ is Interference from other users. However, in a wideband environment, due to the presence of Inter-Symbol Interference (ISI), the short term Signal To Noise Ratio (SNR) is inadequate for measuring the quality of the channel, as described in an article entitled "Upper-bound Performance of a Wideband Burst-by-Burst Adaptive Modem," by C. H. Wong, and L. Hanzo, published in the IEEE Vehicular Technology Conference. Document 483. May 1999.

Other prior art related to WCDMA systems with improved performance include:

U.S. Pat. No. 5,822,318 to E. Tiedemann, Jr. et al., issued Oct. 13, 1998 (Tiedemann) discloses a method and apparatus for controlling transmission power in a variable rate communication system. The method disclosed provides for a closed loop power control method. A first remote station controls the transmission power of a second remote station by transmitting a rate dependent power control signal to the second remote communications system. Since only the second communications system knows its transmission rate a priori, it must determine a course of action in accordance with both the received power control signal and the knowledge of its transmission rate.

U.S. Pat. No. 5,715,526 to L. A. Weaver, Jr., et al., issued Feb. 3, 1998, (Weaver) discloses an apparatus and method for controlling a final transmit power, Y of a base station in a cellular communications system that has several channels. The base station has a transmitter power tracking gain; 'Y' and a radio frequency transmit power, 'W'. The apparatus comprises channel elements for calculating expected power $P_{k,a}$–$P_{kf}$, each of which corresponds to a channel. The apparatus also comprises a transceiver system controller (BTSC) for generating a desired output power, $Y_d$ of the base station, including an adder for summing the expected powers. The apparatus also includes a transmit power detector for measuring 'Y' to obtain the measured transmit power. The apparatus further comprises a radio frequency interface card (RFIC) for generating 'Y'. Finally, the apparatus includes a gain unit for processing 'Y' and 'W' to obtain the final transmitted power, 'Y.'

U.S. Pat. No. 5,383,219 to C. E. Wheatley, III, et al., (Wheatley) issued Jan. 17, 1995, discloses a power control process which enables a mobile radio telephone to continuously update the base station on the power output required. The base station sends a frame to the mobile at a particular rate. If the mobile received and decoded the frame correctly, the mobile sets a power control bit in the next frame to be transmitted to the base station. Based on the error rate of the received power control bits, the base station determines whether to increase or decrease the transmit power.

U.S. Pat. No. 5,729,557 to S. H. Gardner, et al, issued Mar. 17, 1998, (Gardner) discloses a method and apparatus for using multiple code rates for forward error correction in a cellular digital radio communication system. Each base station broadcasts a quantity called the power product (PP) which is equal to the base transmit power, $P_{BT}$ multiplied by the power level received at the base station, $P_{BR}$. For a mobile unit to determine it's appropriate transmit power, $P_{MT}$ requires measuring the power received, $P_{MR}$ at the mobile unit and performing a calculation. When the channel path loss is large it is possible that the power control calculation will return a value greater than the maximum transmit power capability of the mobile unit. In such case, the mobile unit selects a lower code rate. The base station receiver sensitivity improves as the code rate decreases, so the result is similar to increasing the transmit power. In the preferred embodiment, the invention uses three different code rates. In most cases, the code rate used is two-thirds, but when a mobile unit determines that it needs more transmit power than it is capable of providing, the code range is changed to one-half, and in severe cases the code rate is changed to one-third.

JP6-276176 to Tetsuyoshi et al, published Sep. 30, 1994 (Tetsuyoshi) discloses reducing intra-signal interference at the time of demodulating signals from respective remote stations by preparing plural chip rates and appropriately allocating them for the respective remote stations. When the power level of reception signals initially detected by reception power detection or the signals from remote stations, a chip rate deciding circuit judges that the reception power level causes strong interference and the inverse spread demodulation of the signals. The present chip rate in this case is changed and the remote station is informed from a chip rate informing circuit. In a remote station a spreading code is generated corresponding to the chip rate informed from the base station. A spreading code is generated supplied to a spectrum spread modulation part to perform spread spectrum spread modulation and transmitted to the base station. Thus, the base station performs an inverse spread processing by the chip rate and interference is reduced at the remote stations.

In prior art systems, past estimates of the signal to interference ratio are used to adjust the transmitter power. Due to the fading of the wireless channels, past estimates of the received SNR is not an adequate technique for optimum power control. None of the prior art uses future prediction of the channel power and based on the channel probability density function to set the optimum threshold to control transmitter gain and rate as in the present invention.

SUMMARY OF THE INVENTION

An object of the invention is a communication system such as a WCDMA system and method of operation having adaptive modulation for improved system throughput, channel capacity and transmit power control.

Another object is a WCDMA system and method of operation using channel prediction and Seamless Rate Change(SRC)/Transmit Power Control(TPC) logic for power and rate management.

Another object is a WCDMA system and method of operation with improved adaptive power management using the transmitter power control bits in WCDMA transmit slots.

Another object is a WCDMA system and method of operation with improved adaptive power management using pilot bits for adaptive transmitter diversity.

These and other objects, features and advantages are achieved in a WCDMA system and method which maximizes throughput, control channel capacity/transmit power and maintains connectivity between a base and a mobile station using:(i) Channel prediction and SRC/TPC logic; (ii) Transmitter Power Control bits in WCDMA transmitter slots and (iii) Adaptive Transmitter Diversity (ADT). A base or mobile transmitter includes a pilot channel, which transmits control and power control signals between a mobile station and the base station to reconfigure the transmitter according to predicted future attenuation of the channel power and its probability density function (pdf). The information signals are encoded using a one-half Viterbi encoder and interleaved. The interleaved data bits are mapped using Quadrature Phase Shift Keying (QPSK) modulation. The QPSK data is multiplexed with the pilot channel and spread by an appropriate orthogonal code and long code corresponding to the orthogonal code length negotiated at call establishment. The output of the transmitter is provided to diverse antennas for reliable communications to the receiver. The forward and reverse system receivers are substantially similar. Data is received at two diverse antennas. The outputs are provided to matched filters which supply a coherent rake receiver and a channel prediction system at the base station. The future attenuation of the channel for several milliseconds is determined by the channel prediction system. In one embodiment, a Seamless Rate Change (SRC)/Transmit Power Control (TPC) logic uses the predicted channel power and sets appropriate thresholds to signal both the transmitter and receiver to reconfigure the transmit rate or power. In this case, according to the set thresholds both the transmitter and the receiver at the beginning of each WCDMA slot, modify its transmit rate when the predicted channel power level lies within a threshold level. The dedicated pilot channel is used to signal the mobile station or the base station for the SRC modification. The SRC/TPC logic also inputs the coherent rate receiver to synchronize the receiver with the new rate and provide an output to a QPSK demodulator, after which the data is de-interleaved and provided to a Viterbi decoder for reliable communication in providing an output signal. In another embodiment, the transmitter power control bits are entered in the transmitted slots according to the predicted channel power thresholds mentioned above. When the predicted channel power falls below a threshold level, a predetermined level increases the transmitter power. When the predicted channel power is above a threshold, the predetermined level reduces the transmitter power. In still another embodiment, the base station transmits the predicted channel power of two diverse antennas to the mobile station. The mobile station compares the power values of the two channels to the thresholds and selects the antenna that propagates through the better channel path, which reduces Multi Access Interference (MAI) and Inter-Symbol Interference (ISI). The three embodiments aid a WCDMA system in maintaining conductivity; minimizing mobile station power consumption by optimizing transmitter power or transmitter antenna diversity; and provide transmitter and receiver reconditioning and capacity improvement.

DESCRIPTION OF THE DRAWING

The invention will be further understood from the following detailed description of a preferred embodiment taken in conjunction with an appended drawing, in which.

DESCRIPTION OF PREFERRED EMBODIMENT

Figure 1:
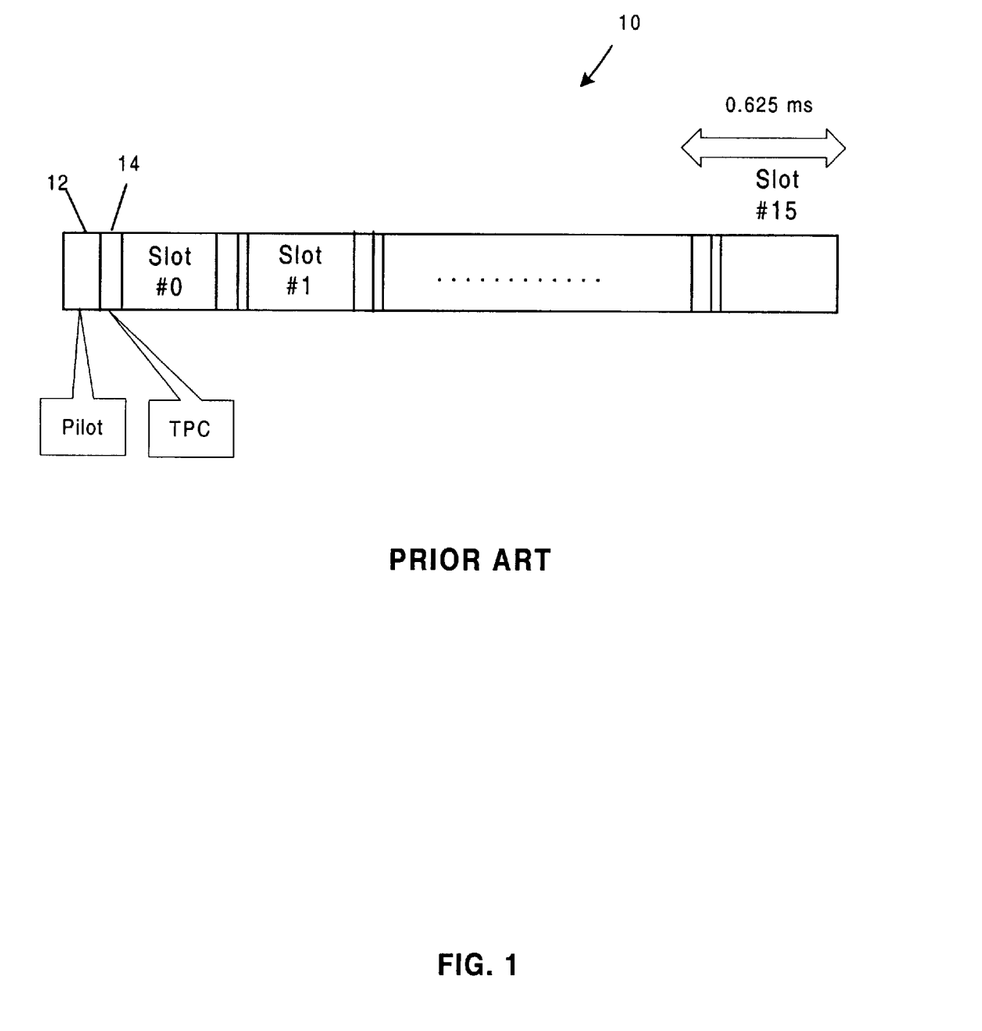
FIG. 1 is a representation of a frame structure in a WCDMA time slot in the system of FIG. 2.

In WCDMA systems, symbols are transmitted using Quadrature Phase Shift Keying (QPSK) and Direct Sequence CDMA (DS-CDMA). The chip rate is 4.096 MHz. Each physical channel is organized in a frame structure, such that each slot consists of 2560 chips. This is described in an article entitled "Channel Estimation for the W-CDMA System, Performance and Robustness Analyses from a Terminal Perspective," by B. Lindof, C. Ostberg, and H. Eriksson, published in the IEEE Vehicular Technology Conference. Document 90 May 1999. FIG. 1 illustrates a W-CDMA frame structure 10 including time slots 0 through 15. Each frame includes pilot bits 12 and transmitter power control bits 14. For the down link, pilot symbols are time-multiplexed with data symbols and every slot starts with a group of pilot symbols (4 or 8) which maybe used to estimate or predict the channel and perform synchronization.

Figure 2:
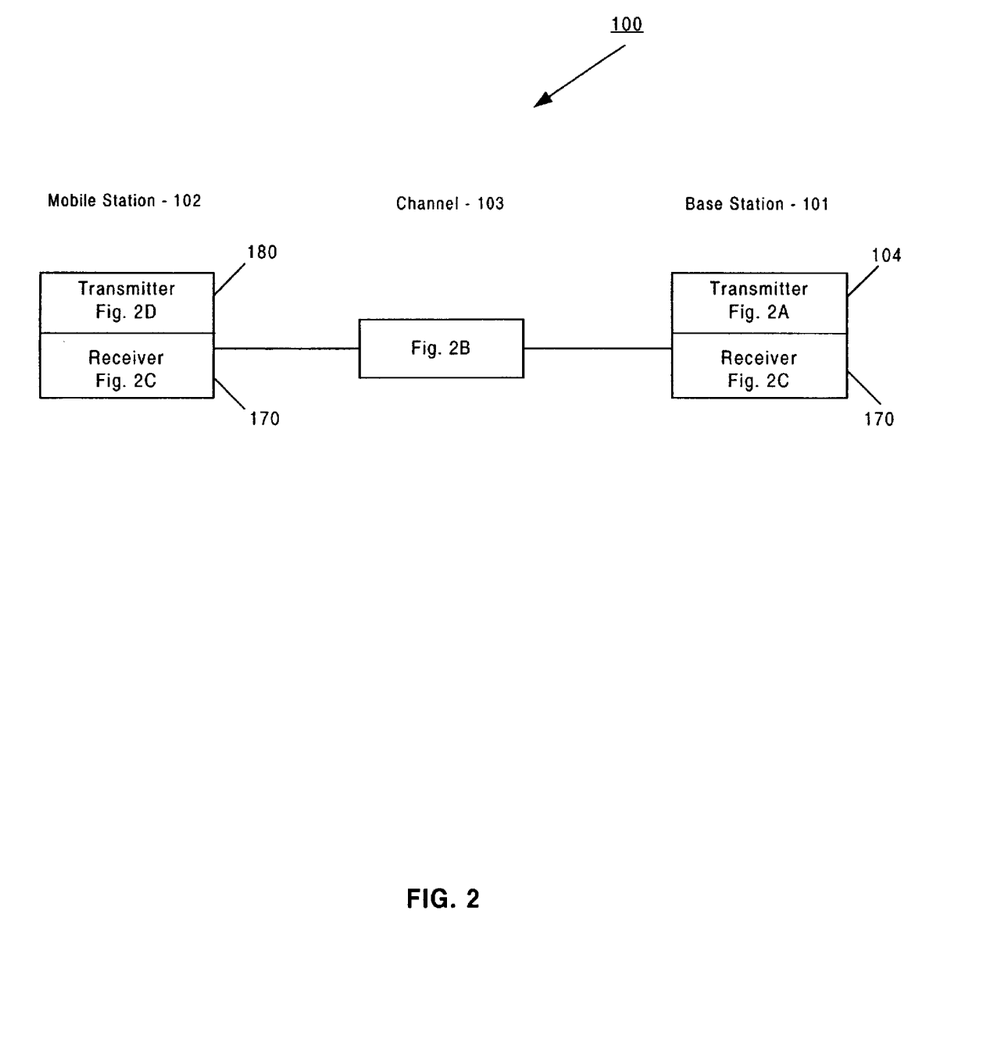
FIG. 2 is a layout of base station and a mobile station in a WCDMA system incorporating the principles of the present invention.
Figure 2A:
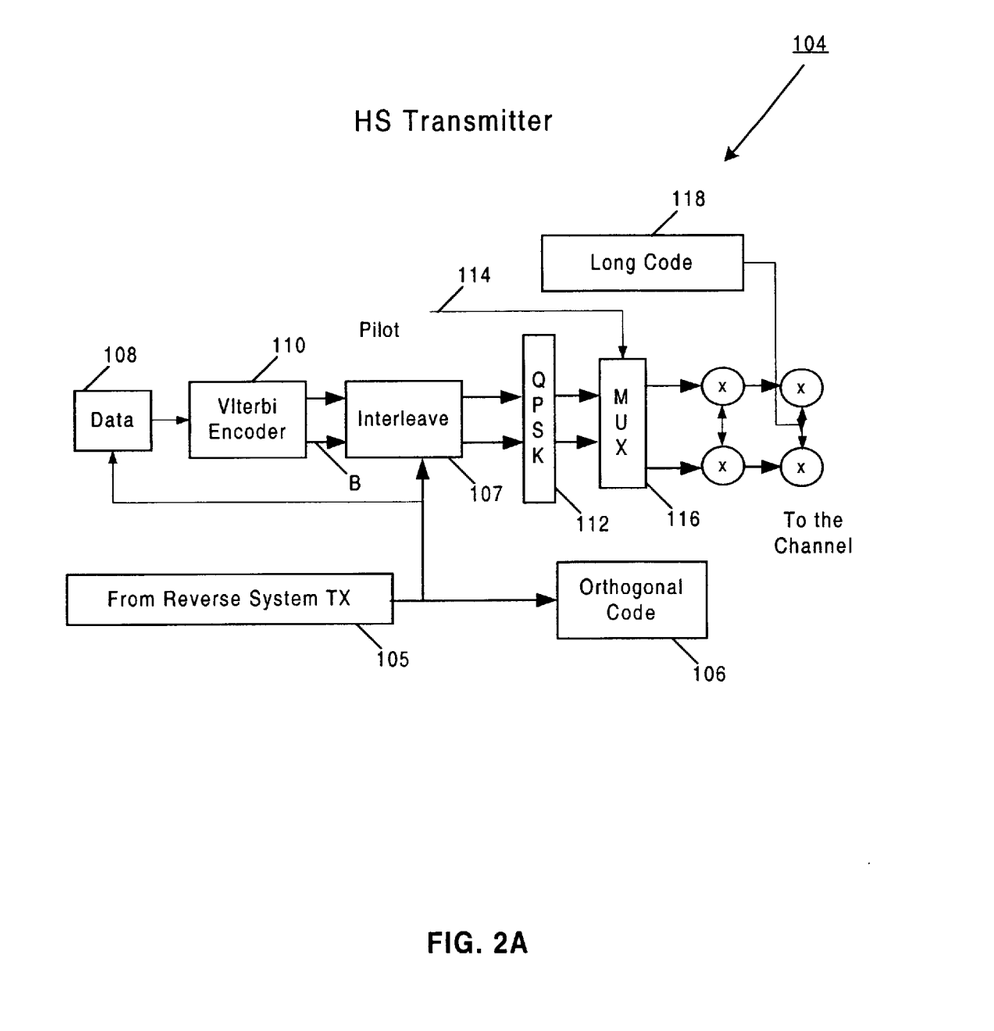
FIG. 2A is a block diagram of a base station transmitter in FIG. 2.
Figure 2B:
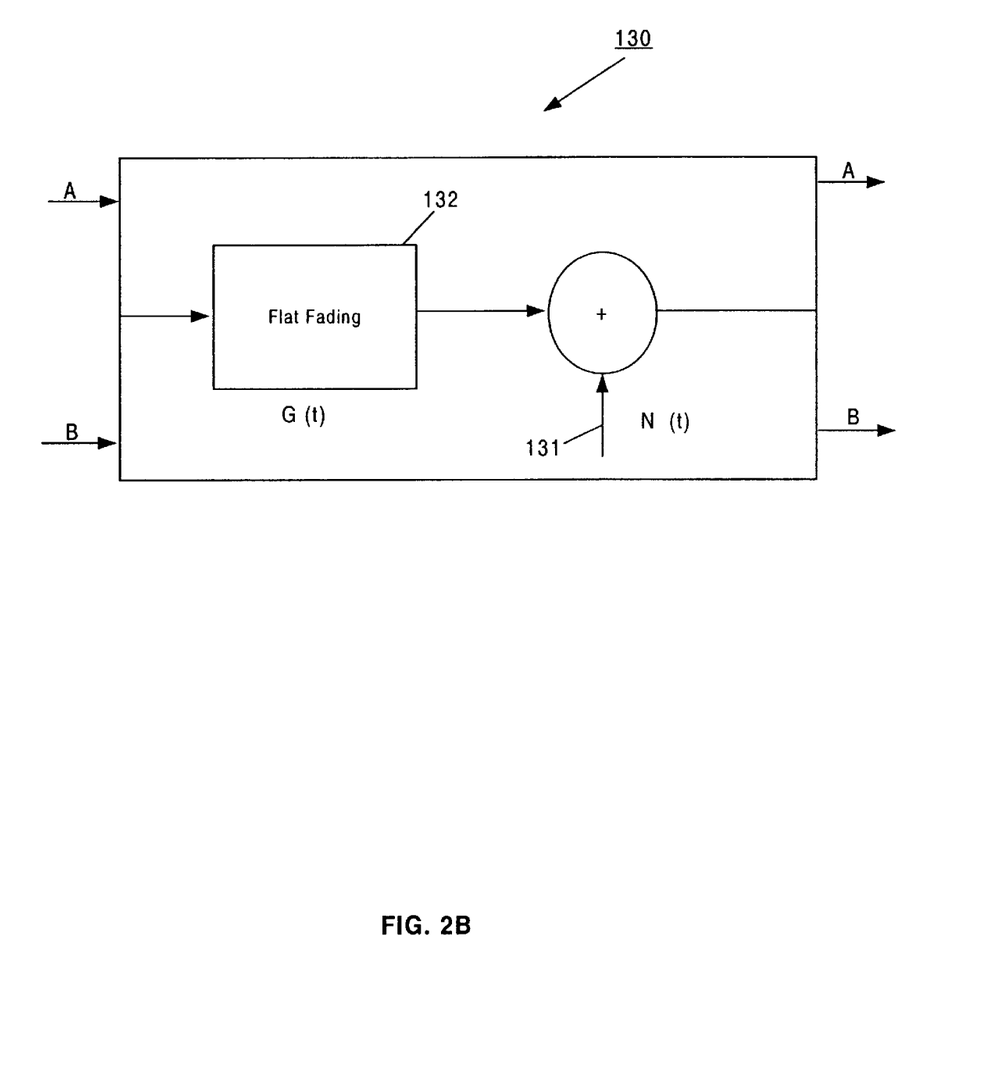
FIG. 2B is a block diagram of a channel baseband model included in FIG. 2.
Figure 2C:
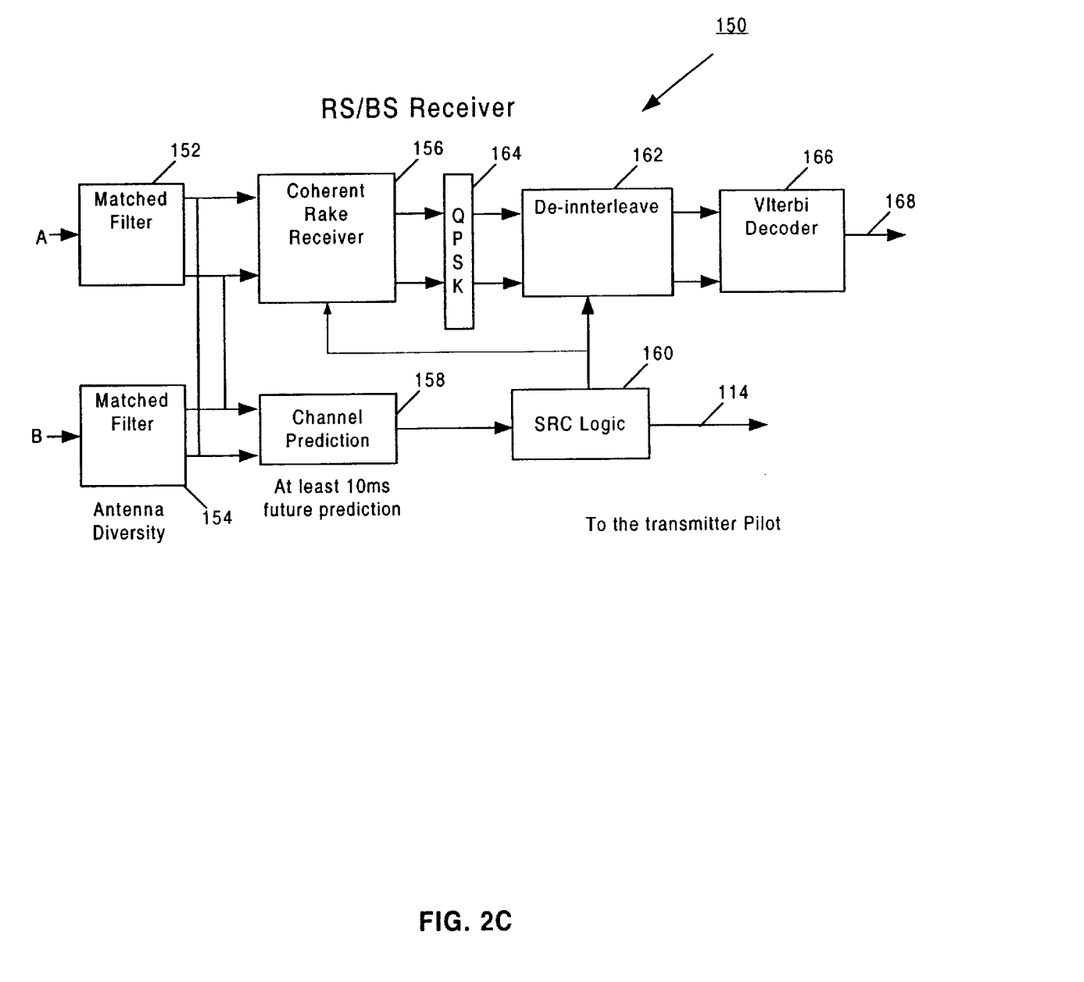
FIG. 2C is a block diagram of mobile or base station receiver in FIG. 2.
Figure 2D:
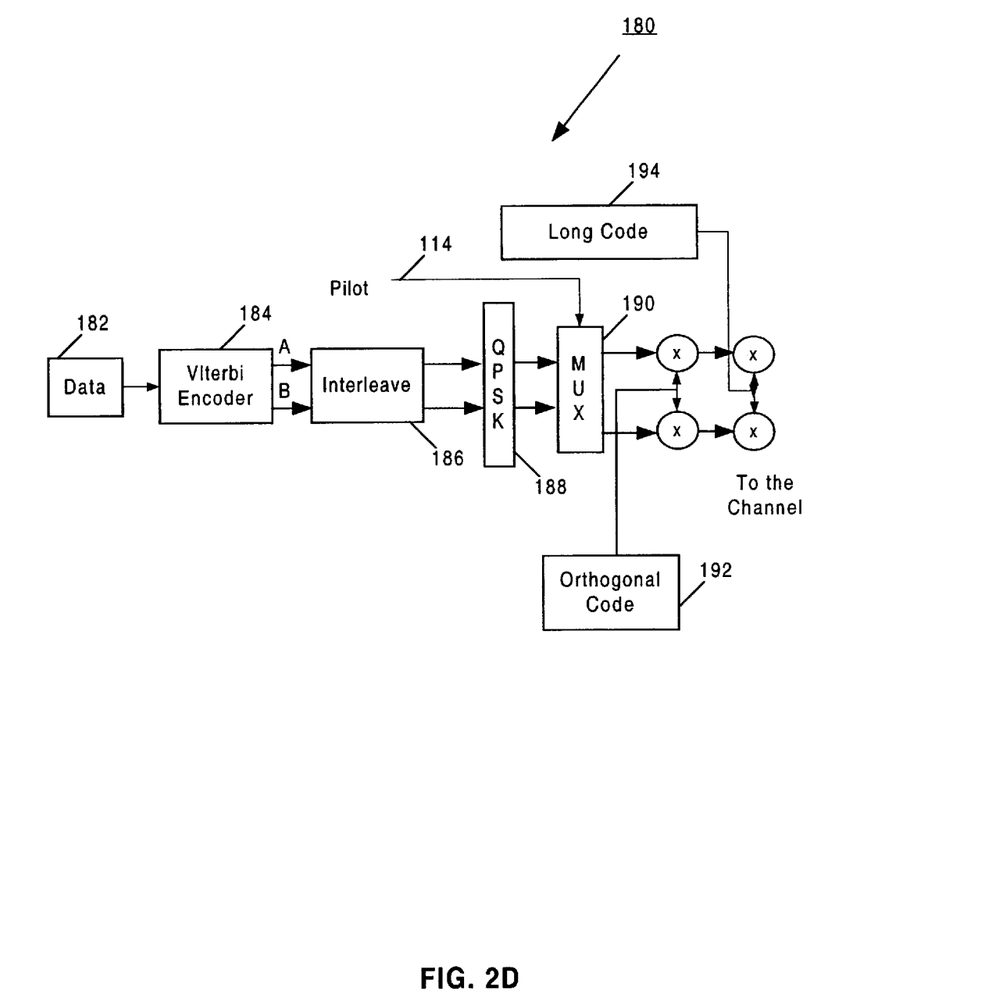
FIG. 2D is a block diagram of a mobile station transmitter in FIG. 2.

The present invention proposes a technique for adaptive modulation of a WCDMA system 100 shown in FIGS. 2–2D. It uses an algorithm for "Deterministic Channel Modeling and Long Range Prediction of Fast Mobile Radio Channels," by T. Eyceoz, A. Duel-Hallen, and H. Hallen (Eyceoz), published in the IEEE Communication Letters, Vol. 2, No. 9, September 1998 (Eyceoz) for long range prediction of the mobile channels and fully incorporated herein by reference.

In FIG. 2, a base station 101 is linked to a mobile station 102 through a channel 103, as further shown in FIGS. 2A–2D.

In FIG. 2A, a base station or forward system transmitter 104 includes a terminal 105 for receiving a reverse transmitter signal. This is provided as an input to an orthogonal code generator 106 and an interleaver 107 for combining the reverse transmitter signal with a data source 108 after processing by a Viterbi encoder 110. The processed signal as data symbols is separated into first and second channels, real and imaginary, A and B, coupled to a Quadrature Phase Shift Keying (QPSK) unit 112. A Multiplexer 116 retrieves the channel A channel B outputs from the QPSK unit 112 and time multiplexes a pilot signal 114 with the data symbols in a series of data frames 10 (See FIG. 1), as will be explained in more detail hereinafter. The data frames are transmitted in channels A and B to a mobile receiver 150 (See FIG. 2C) using the OFDM Code 106 modified with a spreading or long code 118, as will be described in more detail hereinafter.

In FIG. 2B, a baseband model 130 is shown for channels A and B. Each channel is modeled as an Additive White Gaussian Noise (AWGN) 131 and a Time Bearing Flat Fading (TBFF) 132 in which the selected fading due to the multipath is negligible.

In FIG. 2C, a mobile station or reverse system receiver 150 is similar to the base or forward receiver 170 (See FIG. 2). Each receiver includes matched filters 152, 154 for antenna diversity in receiving channels A and B. The outputs of the match filters are fed into a coherent rake receiver 156 and a channel prediction or estimation system 158. The channel prediction system determines the future attenuation of the channel for several milliseconds as described in the Eyceoz article, supra. The time interval is enough to allow both the base station and the mobile station to reconfigure their transmitters and receivers. An SRC/TPC logic device 160 uses the prediction of the channel power and the channel coefficients to signal both the transmitter and receiver to reconfigure the channel power and/or channel rate according to whether the channel power is above or below a threshold level. This will be described in FIGS. 7 and 8, hereinafter. The SRC/TPC logic 160 provides input to the rake receiver 156 and to a de-interleaver 162 to adjust the transmission rate in both channels A and B during and after processing of the data in a QPSK device 164. The SRC logic can also determine which antenna is receiving the signal more accurately and signal its or remote transmitter to use that antenna for transmission to the base station which can reduce Multi Access Interference (MAI). The de-interleaver 162 provides an output to a Viterbi decoder 166, which provides an output signal 168 to a user. A dedicated pilot channel 114 is used to signal the mobile station or the base station to reconfigure.

In FIG. 2D, a mobile station transmitter or reverse system transmitter 180 includes a data source of symbols 182 encoded in a Viterbi encoder 184 and separated into channels A and B. The signals are processed in a ten-millisecond block by an interleaver 186 and a rate one-half Viterbi encoder. The interleaved data bits are mapped in a QPSK modulator 188. The QPSK data is processed in a multiplexer 190 with the pilot signal 114 from the receiver 150. (See FIG. 2C.) An OFDM unit 192 spreads the multiplexer output in channels A and B by an appropriate orthogonal code after which a long code 194 is added corresponding to the orthogonal code length negotiated at call establishment. An output of the channels A and B is over sampled in pulse chap before being sent to the channel.

In wireless systems, a propagation channel is usually modeled as Raleigh distributed. Therefore, the channel power (P) has a chi-square probability distribution with 2 degrees of freedom. The following equations illustrate this relation:

$$p_Y(y) = \frac{1}{2\sigma^2} e^{-y/2\sigma^3}, y \geq 0 \qquad \text{EQ (1)}$$

Where:

$P(Y)$=Channel Power $\qquad$ EQ(2)

$\sigma^2$=variance $pdf_y = \sigma^2$ $\qquad$ EQ(3)

The pdf of the signal-to-noise ration (SNR) at the receiver is $$p(\gamma_b) = \frac{1}{\overline{\gamma}_b} e^{-\gamma_b/\overline{\gamma}_b} \qquad \text{EQ (4)}$$

Figure 3:
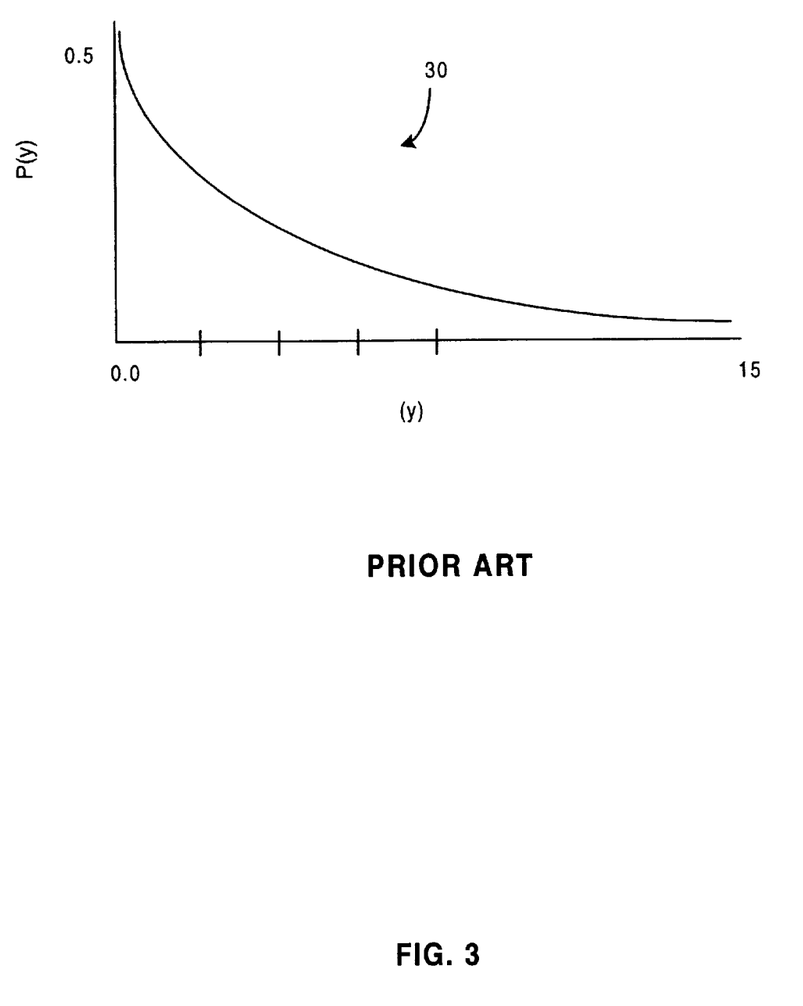
FIG. 3 is a graph of a channel power probability density function (pdf) and having a chi-square distributed random variable for two (2) degrees of freedom in the system of FIG. 2.

FIG. 3 illustrates a Probability Density Function (pdf) 30 of a chi-square-distributed random variable for 2 degree of freedom, as more fully described in an article entitled "John Proakis, *Digital Communications*. New York: McGraw Hill, 1995, pgs. 45–47. Applying a long-range channel prediction process, a 10 ms prediction time in one W-CDMA frame, a Base Station (BS) can predict the channel power profile of a Mobile Station (MS). The pdf of the predicted channel power should theoretically be similar to the one in FIG. 3.

Figure 4:
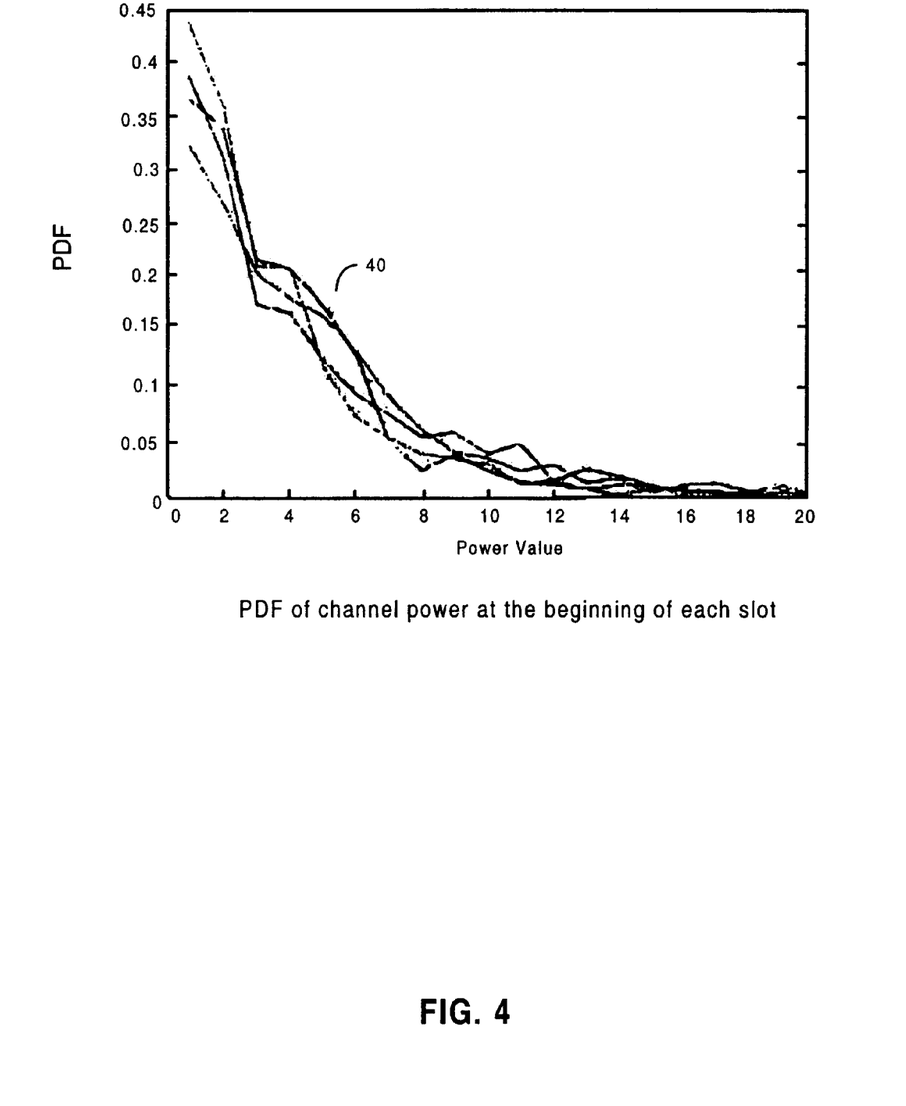
FIG. 4 is a graph of channel probability density function versus power value at the beginning of each WCDMA time slot.

We conducted an experiment to prove the performance of the proposed process. In this experiment we assumed BS prediction of the channel power at the beginning of each slot for the duration of a frame is perfect, the pdf of four Independent Identical Distributed (IID) channel powers 40 has been computed and illustrated in FIG. 4.

By definition to obtain the probability of error for a BPSK (2 BPSK same as QPSK) system is evaluated by the integral, $$P_2 = \int_0^\infty P_2(\gamma_b) p(\gamma_b) d\gamma_b$$

The resulting system is evaluated by the integral, $$P_2 = \frac{P}{2}\left[1 - \sqrt{\frac{\overline{\gamma}_b}{1+\overline{\gamma}_b}}\right]$$

Figure 5:
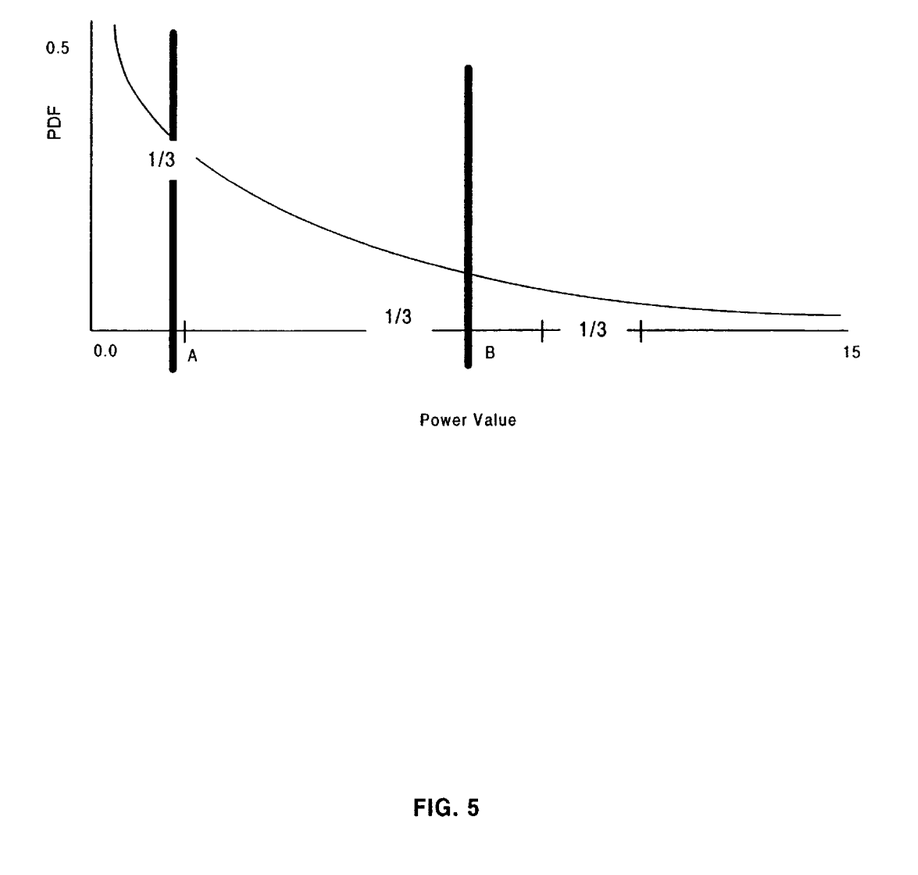
FIG. 5 is a graph of channel pdf separated into three equal probable regions for the system of FIG. 2.

In the present invention, the pdf of the channel power is divided into several regions in which the probability of every region is equal. FIG. 5 illustrates a three-region pdf of the channel power.

In the case where the pdf is divided into three equal probable regions ( 0–A; A–B; B–∞), the area under the exponential curve for each region is equal to 0.333. In other words, the probability that the system operates in poor, nominal and high channel conditions are the same. In the three-region system of FIG. 5, the above equations for the channel power becomes as follows. In the following equation, A and B are normalized for each region with their corresponding SNR value $$P_2 = \int_0^A P_2(\gamma_b)p(\gamma_b)d\gamma_b + \int_A^B P_2(\gamma_b)p(\gamma_b)d\gamma_b + \int_B^\infty P_2(\gamma_b)p(\gamma_b)d\gamma_b$$

Since the predicted power level of every transmit slots is available at a Mobile Station (MS), a System can configure its transmitter at the beginning of each slot time. In this case the MS can optimize its transmitter in order to minimize its probability of error at the Base Station (BS) receiver. Optimization improves the quality of the system by improved adaptive power control using the following techniques: (a) Transmitter Power Control (TPC) bits provided in the W-CDMA slots; Seamless Rate Change (SRC) using pilot bits, and (c) Adaptive Transmitter Diversity (ATD) using pilot bits, as follows:

A. General Procedure

The MS transmitter modifies transmitter power rate by changing a spreading factor (SF) or antenna based on a threshold set by the BS. In such case, either the MS or BS compute "A & B" values (FIG. 5.). These values are selected such that the system operates 33% of time in low-power region (0–A), 33% in the optimum power level (A–B) and 33% in the higher power region (B–∞). Since the total average power is 1, the long-term average power of the three-region system is also equal to 1.

B. TPC

Figure 6:
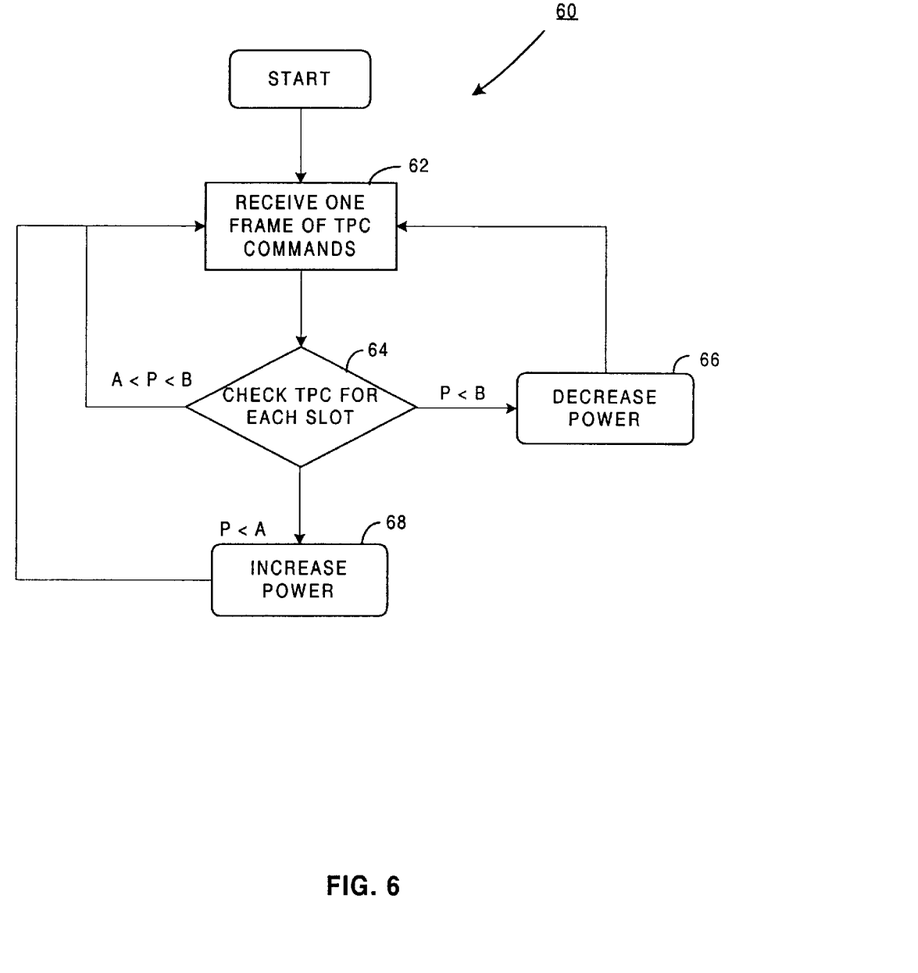
FIG. 6 is a flow chart of the base station transmitter in the system of FIG. 2 using Transmitter Power Control (TPC) bits in the WCDMA time slots for power management.

When the system operates in a TPC mode, and when the predicted channel power falls below the "A–0" range, the system increases the transmitter power by 3 dB. When the predicted channel power goes above the "B" range, the system reduces its transmitter power by 3 dB. And finally the system makes no adjustment when the predicted channel power lies between "A & B." FIG. 6 shows a flowchart 60 for the BS transmitter when operating the system in the TPC mode, as follows:

At start, the system receives one frame of seamless rate change commands (SRC) 62. A test 64 is performed in which the TPC bits are checked in each slot. When the predicted power (P) is in the 0–A range, the system increase the transmitter power by 3 dB by decreasing the rate in step 66. When the predicted power (P) goes above the B range, the system reduces the transmitter rate by 3 dB by increasing the rate in step 68. When the the predicted power is within the A and B ranges, the system makes no adjustment to the transmitter power.

C. SRC

Figure 7:
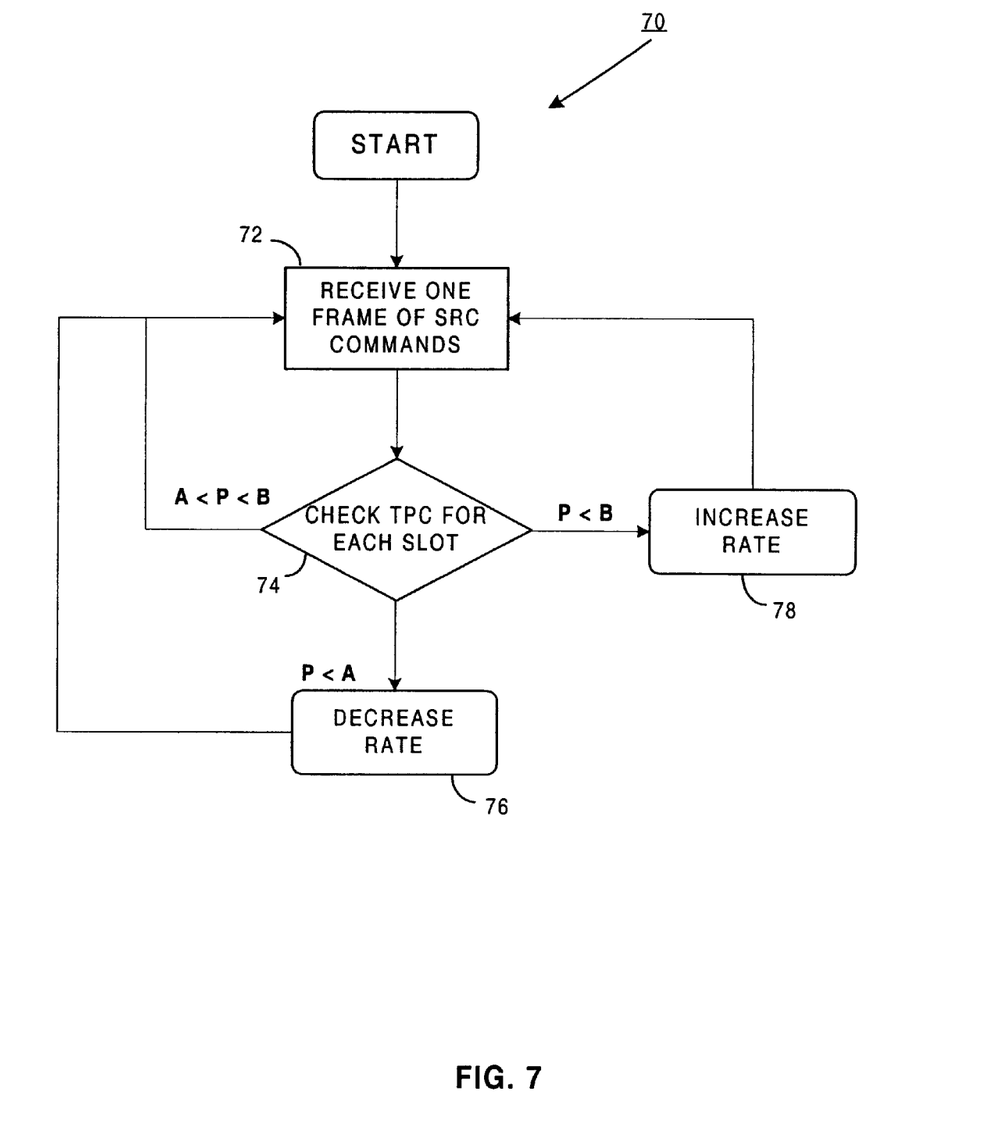
FIG. 7 is a flow chart of the base station transmitter in the system of FIG. 2 when operating the system with Seamless Rate Change (SRC).

FIG. 7 shows a flow chart 70 illustrating the operation of the system in the seamless rate change (SRC) mode. At start, the system receives one frame of seamless rate change commands (SRC) 72. A test 74 is performed in which the SRS bits are checked in each slot When the predicted channel power falls below "A" range, the transmit rate is reduced in a step 76 and a longer spreading code (2* SF)is used,. In step 78, when the predicted channel power goes above the "B" range, transmitter rate is increased and a shorter spreading code (½ * SF) is used,. And finally the system makes no adjustment when the predicted channel power lies between "A & B."

Figure 8:
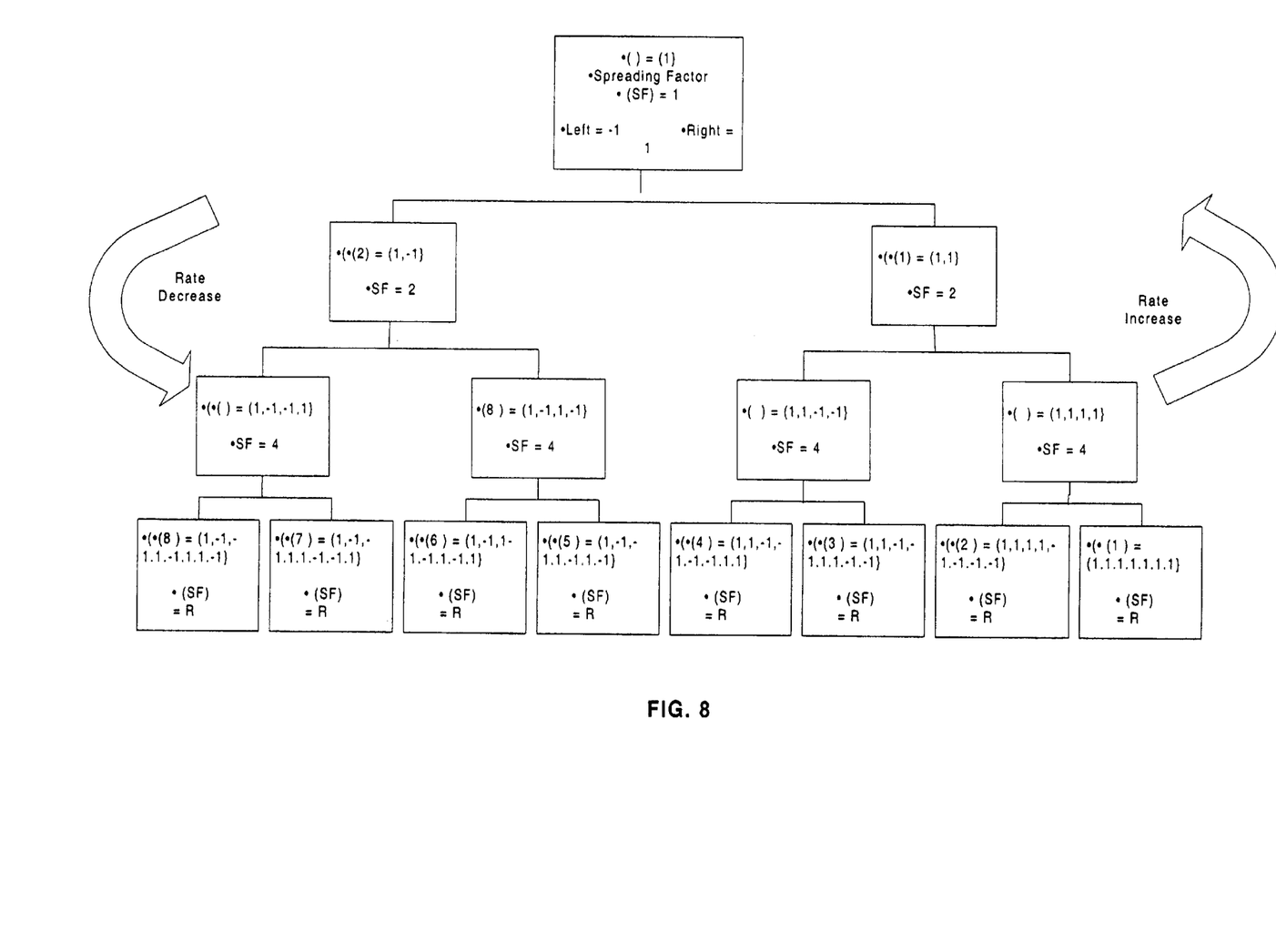
FIG. 8 is a flow chart for selection of a spreading code in the system of FIG. 2 when a system modifies transmitter rate.

In FIG. 8, an algorithm 80 adjusts the spreading code C (1). When the predicted channel power falls below a threshold, the transmitted rate is reduced and a longer spreading code is used. In block 84 the spreading code is doubled when the threshold level is exceeded. The spreading code is increased to 4 and 8 in blocks 86 and 88. When the predicted channel power goes above the threshold, the transmitter rate is increased and a shorter spreading rate spreading code is used as shown in blocks 85, 87 and 89. The spreading code is not adjusted when the predicted channel power lies at the threshold level.

D. ATD

Figure 9:
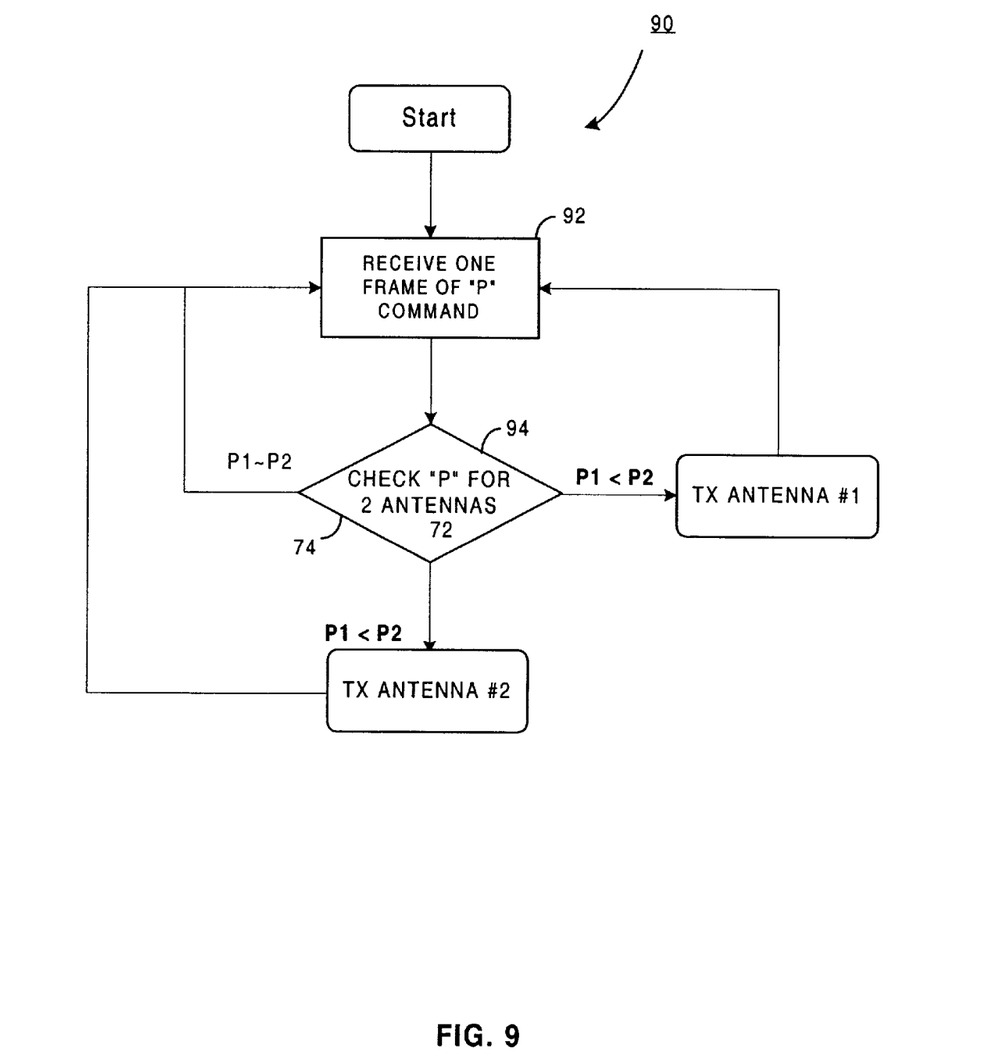
FIG. 9 is a flow chart of the base station transmitter in the system of FIG. 2 when operating the system with Adaptive Transmitter Diversity (ATD).

FIG. 9 illustrates a flowchart 90 for the BS transmitter when operating the system with Adaptive Transmitter Diversity. When the System operates in ATD mode, the BS receiver predicts the channel power for the two input receivers after receiving a frame of Power (P) commands in step 92. The BS transmit the predicted channel power values of one frame to the MS receiver via the pilot bits. Similar to the TPC or SRC processes 60, 70, the MS compares the Power values to the threshold in a step 94 and selects the transmit antenna #1 or #2 that propagates through the better of the two transmit paths. This process can be reversed and the role of BS and MS can be altered such that the BS perform the antenna selection and the MS performs the prediction.

Summarizing, a WCDMA system has been disclosed with adaptive channel power control using Transmitter Power Control Bits (TPCB) in the frame transmit slots and seamless rate change and/or adaptive transmitter diversity using pilot bits. The WCDMA system is capable of supporting variable data rate by configuring its receiver and transmitter to the data rate determined at a call establishment or adaptively change during transmission by means of adjustment in the length of its orthogonal code generation. Pilot set channels associated with individual data channels carry control signals to adjust transmit and receive power levels. As a result, throughput is maximized, channel capacity increased while reducing transmit power and overall maintaining connectivity.

While the invention has been shown and described in a preferred embodiment, various changes can be made without departing from the spirit and scope of the invention as defined in the appended claims, in which:

I claim:

1. A Wide-band Code Division Multiple Access ("WCDMA") system comprising:
    a base station and a mobile station;
    a first channel including a baseband signal having a variable transmission rate for data transmission coupling the base station and the mobile station;
    a pilot channel including a group of pilot data signals and a group of transmission power control data signals;
    means responsive to the baseband signal for predicting power attenuation on the first channels by a probability density function based upon signal fading;
    means establishing power thresholds in the first channel using the pilot data signals and based upon the probability density function divided into several ranges in which the probability of the power attenuation in each range is equal to achieve average constant power in the first channel; and
    means responsive to the predicting power attenuation means to signal both a transmitter and a receiver in the first channel over the pilot channel to reconfigure the transmission rate according to the predicted power attenuation.

2. The system of claim 1 further comprising:
    means for transmitting the base band signal in a series of frames, each frame including a plurality of transmit slots;
    means for checking the predicted power attenuation signals in each slot;
    means for checking each slot for predicted power attenuation signals indicative of the channel power;
    means for increasing transmitter power when the predicted power attenuation falls below a threshold; and
    means for reducing the transmitter power when the predicted power attenuation goes above the threshold.

3. The system of claim 1 further comprising:
    means for increasing the transmission rate in a channel when the predicted power attenuation in a range goes above a threshold.

4. The system of claim 1 further comprising:
    means for decreasing the transmission rate in a channel when the predicted power attenuation in a range falls below a threshold.

5. The system of claim 1 further comprising:
    means for transmitting a data signal on the channel using an OFDM code and a long code corresponding to the orthogonal code length negotiated at transmission.

6. The system of claim 1 further comprising:
    a QPSK modulator for processing the baseband signals.

7. The system of claim 1 further comprising:
    multiplexing means multiplexing the baseband signal with the pilot signal; and
    means spreading the multipexed signal by an appropriate orthogonal code and a long code corresponding to the orthogonal code length negotiated at transmission.

8. The system of claim 1 further comprising:
    means for receiving a base band signal in a sense of frames, each frame including channel power values;
    means for checking two antennas associated with both the base station and the mobile station for the channel power values; and
    means for selecting a transmit antenna after comparing the channel power values for each antenna to a threshold.

9. The system of claim 1 wherein the means for reconfiguring the transmission rate further comprises:
    means for defining a channel power probability density function separated into three equal first, second and third probability regions; and
    means for operating the system in a transmit power control mode in which power is increased to a transmitter if the predicted power attenuation falls into the first probability region; power to the transmitter is reduced if the predicted power attenuation falls into the third probability region, and no power adjustment is made to the transmitter if the predicated power attenuation falls into the second probability region.

10. The system of claim 1 wherein the means for reconfiguring the transmission rate further comprises:
    means for spreading the baseband signal by an appropriate orthogonal code and a long code corresponding to the transmission rate;
    means for defining a predicted channel power probability density function separated into three equal first, second and third probability regions; and
    means for operating the system in a seamless rate change node in which a frame includes seamless rate change command bits in the pilot channel indicative of the predicted power attenuation whereby a transmit rate for a transmitter is reduced and a longer spreading code is used if the predicted power attenuation falls into the first region; the transmit rate for the transmitter is decreased and a shorter spreading code is used if the predicted power attenuation falls into the third region and no power adjustment is made to the transmitter transmit rate and spreading code if the predicated power attenuation falls into the second probability region.

11. The system of claim 1 wherein the means for reconfiguring the transmission rate further comprises:
    means for operating the system in an adaptive transmitter diversity mode in which one station predicts power attenuation for multiple antenna power thresholds in the first channel based upon a predicted power density function divided into several ranges in which the probability of every range is equal and transmits the predicted power attenuation values for each antenna to the other station via pilot bits;
    means at the other station for comparing the predicted power attenuation values for each antenna to a threshold; and
    means at the other station for selecting the antenna for signal transmission that has the greatest predicted power values exceeding the threshold.

12. In a wide band code division multiple access ("WBCDMA") system comprising a base station including a transmitter and a receiver, a mobile station including a transmitter and a receiver, dual channels coupled between the base station and the mobile station, each including a baseband signal having a variable transmission rate and a pilot channel coupling the base station and the mobile station, a method for improved throughput, channel capacity and transmit power control of the system, comprising the of;

predicting power attenuation on the dual channels by a probability density function based upon signal fading;

establishing power thresholds in the dual channels using pilot data signal and based upon the probability of the power attenuation divided into several ranges in which the probability of every range is equal to achieve average constant power in the dual channels; and signaling both a transmitter and a receiver in the dual channels over the pilot channel to reconfigure the transmission rate according to the predicted power attenuation.

13. The method of claim 12 further comprising the step of:

establishing a power threshold in the dual channel based upon a probability density function divided into several ranges in which the probability of every range is equal.

14. The method of claim 13 further comprising the step of:

increasing the transmission rate when the predicted power attenuation in a range goes above a threshold.

15. The method of claim 14 further comprising the step of:

decreasing the transmission rate when the predicted power attenuation in a range falls below a set threshold.

16. The method of claim 15 further comprising the step of:

transmitting a data signal on the dual channels using an OFDM code and a long code according to the transmission rate.

17. The method of claim 12 further comprising the step of:

processing the baseband signal using a QPSK modulator.

18. The method of claim 12 further comprising the steps of:

multiplexing the baseband signal with the pilot signal; and spreading the multiplexed signal by an appropriate orthogonal code and a long code corresponding to the transmission rate.

19. The method of claim 12 further comprising the steps of:

transmitting the base band signal in a series of frames, each frame including a plurality of transmit slots;

including a group of pilot signals and a group of transmission power control signals in separate slots of a pilot channel;

checking the predicted power attenuation signals in each slot;

checking each slot for predicted power attenuation signals indicative of the channel power;

increasing transmitter power when the predicted power attenuation falls below a threshold; and reducing the transmitter power when the predicted power attenuation goes above the threshold.

20. The method of claim 12 further comprising the steps of:

receiving a base band signal in a series of frames, each frame including channel power values;

checking two antennas associated with both the base station and the mobile station for the channel power values; and selecting a transmit antenna after comparing the channel power values for each antenna to a threshold.

* * * * *